(12) United States Patent
Nam

(10) Patent No.: US 12,152,787 B2
(45) Date of Patent: Nov. 26, 2024

(54) SYSTEM AND METHOD FOR CONTROLLING COOKING APPLIANCE

(71) Applicant: LG ELECTRONICS INC., Seoul (KR)

(72) Inventor: Sung Woo Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 523 days.

(21) Appl. No.: 17/489,987

(22) Filed: Sep. 30, 2021

(65) Prior Publication Data

US 2022/0128239 A1 Apr. 28, 2022

(30) Foreign Application Priority Data

Oct. 26, 2020 (KR) .................. 10-2020-0139264

(51) Int. Cl.
| | |
|---|---|
| *F24C 7/08* | (2006.01) |
| *F24C 3/00* | (2006.01) |
| *F24C 3/12* | (2006.01) |
| *F24C 7/04* | (2021.01) |
| *G06F 16/2458* | (2019.01) |
| *H04L 12/28* | (2006.01) |
| *H05B 6/06* | (2006.01) |
| *A47J 36/32* | (2006.01) |
| *G06Q 50/10* | (2012.01) |

(52) U.S. Cl.
CPC ............... *F24C 7/08* (2013.01); *F24C 3/008* (2013.01); *F24C 3/12* (2013.01); *F24C 7/046* (2013.01); *G06F 16/2458* (2019.01); *H04L 12/2807* (2013.01); *H04L 12/2827* (2013.01); *H04L 2012/2847* (2013.01)

(58) Field of Classification Search
CPC .. F24C 3/008; F24C 3/12; F24C 3/126; F24C 7/046; F24C 7/08; F24C 7/083; G06F 16/2458; H04L 12/2807; H04L 12/2827; H04L 2012/2847; H05B 6/062
See application file for complete search history.

(56) References Cited

U.S. PATENT DOCUMENTS

2016/0327281 A1* 11/2016 Bhogal ................... F24C 7/085
2017/0285605 A1* 10/2017 Iyer ....................... G05B 19/058

FOREIGN PATENT DOCUMENTS

| EP | 2345849 A2 * | 7/2011 | ............. F23N 1/002 |
| ES | 2473316 A2 * | 7/2014 | ................ F24C 7/08 |
| JP | 2017106679 A * | 6/2017 | |
| JP | 2019215126 A * | 12/2019 | |
| KR | 10-1439325 | 9/2014 | |

(Continued)

*Primary Examiner* — Michael G Hoang
*Assistant Examiner* — Logan P Jones
(74) *Attorney, Agent, or Firm* — KED & ASSOCIATES

(57) ABSTRACT

A system and method for controlling a cooking appliance are provided. The method may include receiving, by a server, a usage time of each of a plurality of burners from a cooking appliance; receiving, by the server, a request to transfer a recipe from a terminal; recommending to the terminal, by the server, a burner having a shortest usage time; transmitting, by the terminal, a control command for turning on the recommended burner to the server; transmitting, by the server, the control command to the cooking appliance; and turning on, by the cooking appliance, the recommended burner according to the control command.

15 Claims, 14 Drawing Sheets

(56) References Cited

FOREIGN PATENT DOCUMENTS

| KR | 10-1500550 | 3/2015 |
| KR | 10-1528872 | 6/2015 |
| KR | 101920068 B1 * | 2/2019 |

* cited by examiner

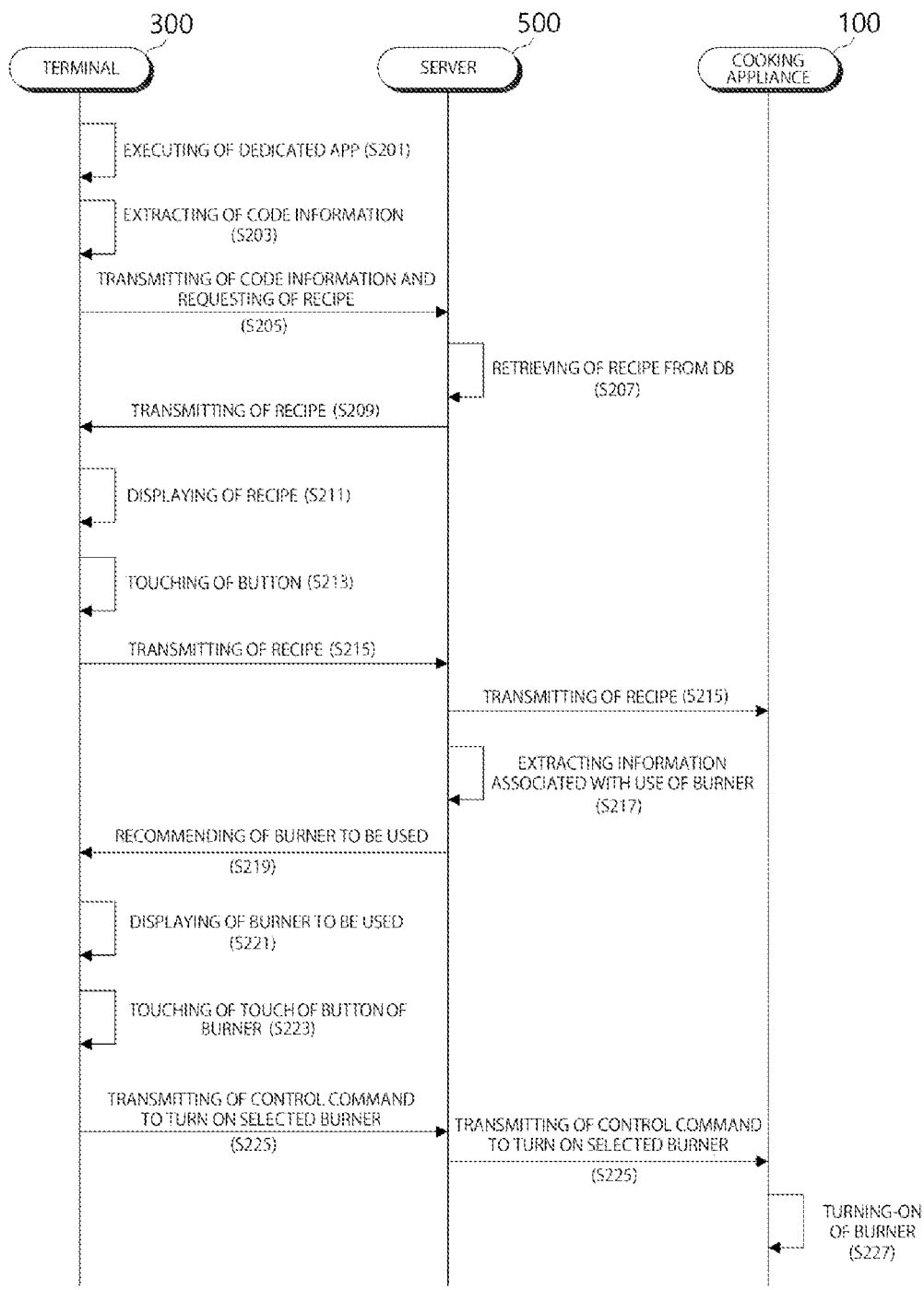

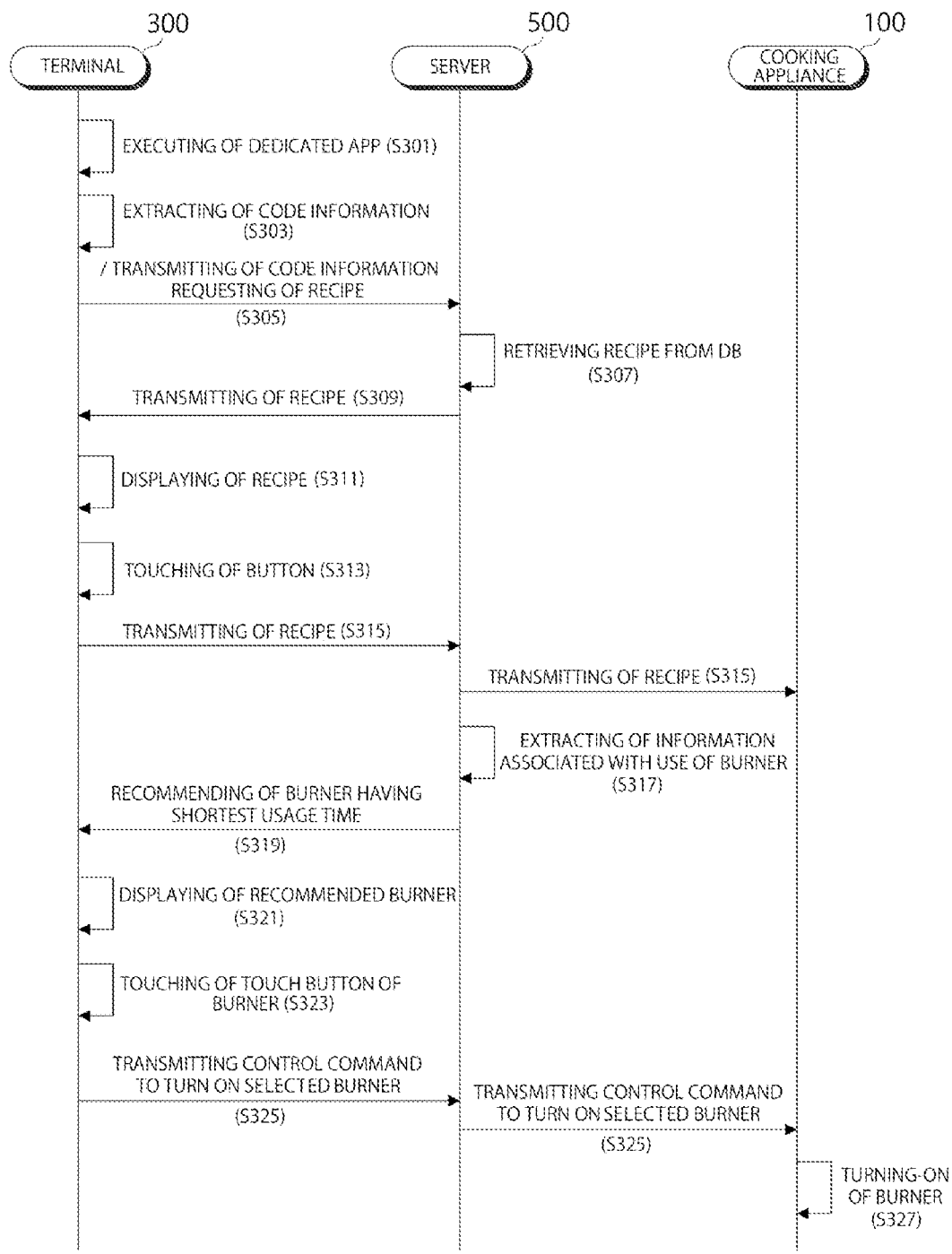

SYSTEM AND METHOD FOR CONTROLLING COOKING APPLIANCE

CROSS-REFERENCE TO RELATED APPLICATION(S)

The present application claims priority to Korean Patent Application No. 10-2020-0139264, filed in Korea on Oct. 26, 2020, the entire contents of which is incorporated herein for all purposes by this reference.

BACKGROUND

1. Field

A system and method for controlling a cooking appliance are disclosed herein.

2. Background

A cooking appliance is a home appliance for heating and cooking food using gas or electricity. Cooking appliances are divided into a closed-type cooking appliance and an open-type cooking appliance according to a type of space in which the food is placed.

The closed-type cooking appliance is a cooking appliance that heats food placed in a enclosed space, by heating the enclosed space, thereby cooking the food. Examples of the closed-type include an oven, and a microwave oven, for example. The open-type cooking appliance is a cooking appliance that heats food or a container containing the food, thereby cooking the food. Examples of the open-type cooking appliance include a gas stove, and an induction heater, for example.

In recent years, multi-functional cooking appliances, each equipped with the open-type cooking appliance and the closed-type cooking appliance in upper and lower portions thereof, respectively, have been available on the market. Among open-type cooking appliances, the gas stove can cook food using flames that occur when gas is burnt. The induction heater can cook food using heat that occurs when a working coil is heated in an induction burner.

The open-type cooking appliance may include a plurality of burners (gas burners or induction burners). Among the plurality of burners, several burners may have a same size and shape or may have different sizes and shapes. Several other burners may have different thermal powers.

Therefore, different burners may be effectively used according to a recipe. The use of burners suitable or most suitable for the recipe may result in better cooking.

In the case of cooking food according to the recipe using a cooking appliance in the related art, a burner suitable or most suitable for the recipe is not known. A user needs to determine, select, and use a burner suitable or most suitable for the recipe with reference to the recipe. For this reason, the cooking appliance is not efficiently used.

In addition, normally, the user tends to use a frequently used burner when cooking. Thus, a plurality of burners may not be uniformly used. Accordingly, a lifetime of the frequently used burner is shortened, and the frequently used burner has to be frequently replaced with a new one.

Korean Patent Nos. 10-1500550 (hereinafter, "Patent Document 1") and 10-1528872 (hereinafter, "Patent Document 2"), which are hereby incorporated by reference, disclose a method of setting power control of an electric cooker. In this method, when performing electric power control, a burner frequently used by a user is not subject to the electric power control. Thus, usability of the electric cooker can be improved.

Korean Patent No. 10-1439325 (hereinafter, "Patent Document 3"), which is hereby incorporated by reference, discloses a technology for efficiently adjusting and distributing electric power to be supplied to burners of an electric cooker and differentially supplying the electric power to the burners thereof. Thus, efficiency of use of available electric power and usage satisfaction with the electric cooker can be increased.

However, in Patent Documents 1 and 2, the user is encouraged to further use the frequently used burner. Thus, the lifetime of the frequently used burner is shortened, and the burners are prevented from being uniformly used. In Patent Document 3, electric power is differentially supplied, but uniform use of the burners is not described.

BRIEF DESCRIPTION OF THE DRAWINGS

Embodiments will be described in detail with reference to the following drawings in which like reference numerals refer to like elements, and wherein:

FIG. 5 is a flowchart of a method for controlling a cooking appliance according to another embodiment;

FIG. 7 is a flowchart of a method for controlling a cooking appliance according to still another embodiment;

DETAILED DESCRIPTION

Figure 1:
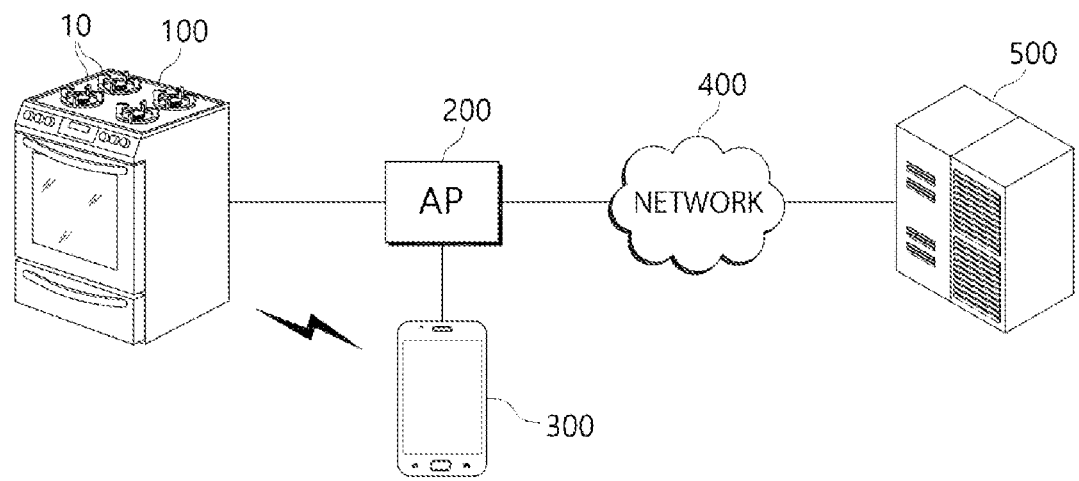
FIG. 1 is a schematic diagram of a system for controlling a cooking appliance according to an embodiment.

Embodiments will be described below for illustrative purpose with reference to the drawings. It should be noted that the same constituent elements, although illustrated in different drawings, are given the same reference character if possible throughout the drawings. In addition, specific or detailed descriptions of well-known configurations and functions associated with embodiments will be omitted when determined as making embodiments difficult to understand.

Figure 2A:
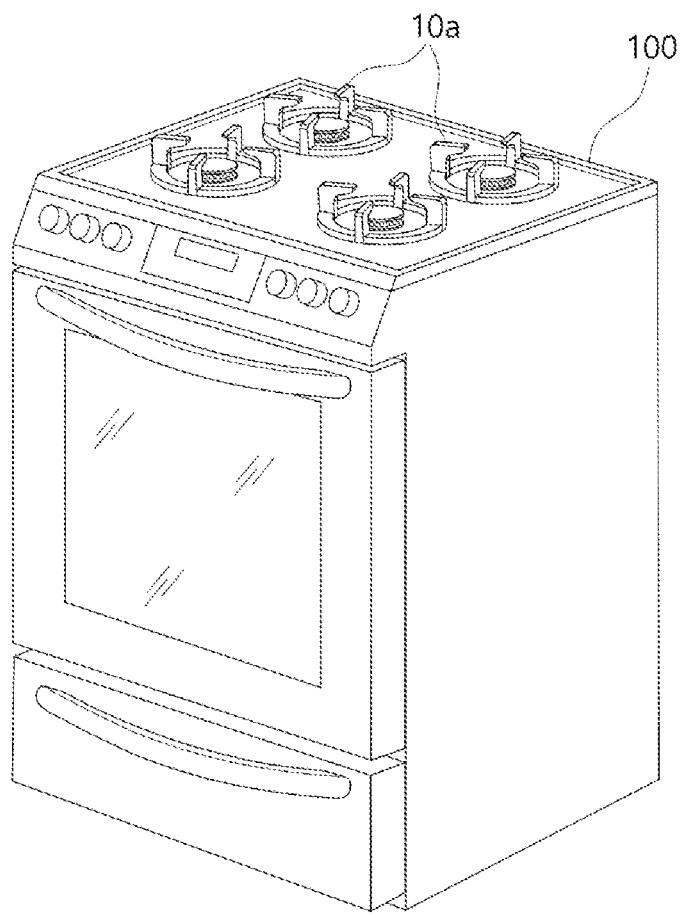
FIGS. 2A to 2C are views each illustrating a cooking appliance.
Figure 2B:
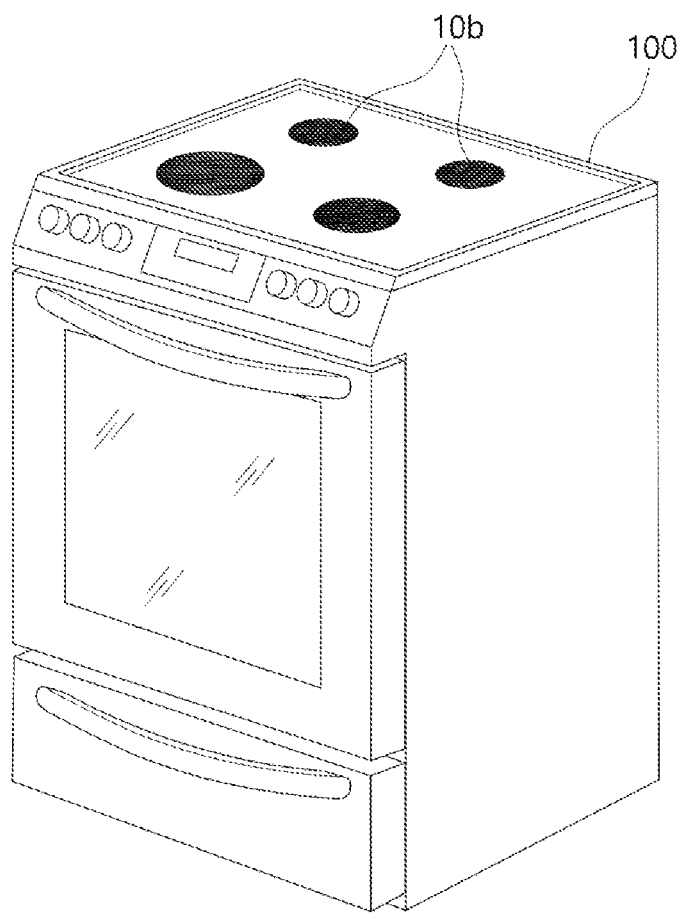
Figure 2C:
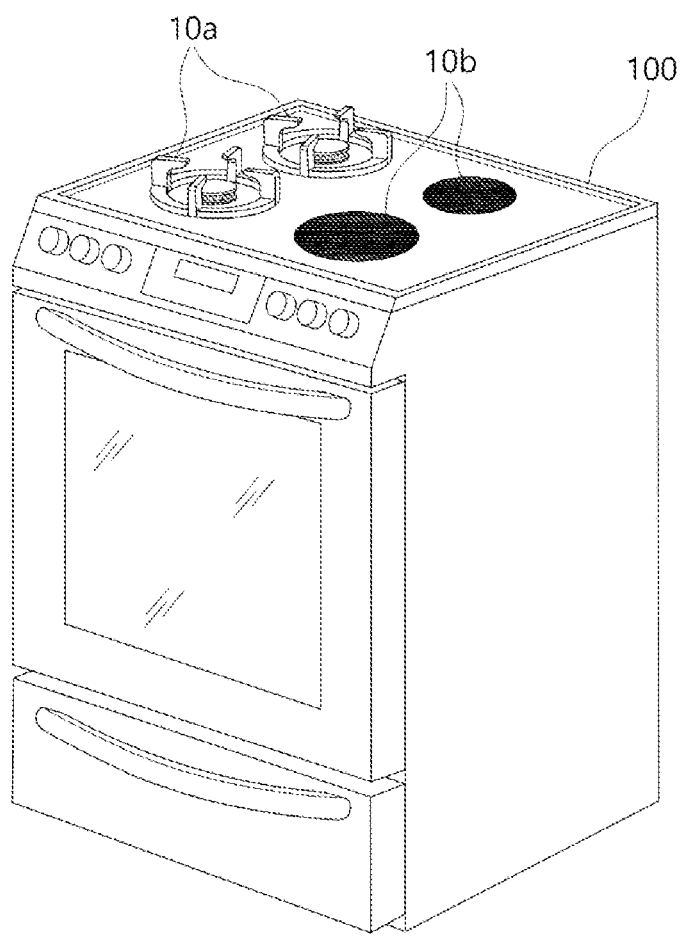

FIG. 1 is a schematic diagram of a system for controlling a cooking appliance according to an embodiment. FIGS. 2A to 2C are views each illustrating a cooking appliance.

With reference to FIGS. 1 to 2C, a system for controlling a home appliance according to an embodiment may include a cooking appliance 100, a terminal 300, and a server 500. The terminal 300 may be connected to the cooking appliance 100 through an access point (AP) device 200. The server 500 may be connected to the cooking appliance 100 and the terminal 300 through the AP device 200 and a network 400, for example, the Internet.

The cooking appliance 100 may be an open-type cooking appliance equipped with a plurality of burners 10 or may be a multi-functional cooking appliance that includes the open-type cooking appliance equipped with a plurality of burner 10.

The term "burner" collectively refers to an apparatus or a component, such as, for example, a gas burner 10a, as shown in FIG. 2A, or an induction burner 10b, in FIG. 2B, which is mounted in the open-type cooking appliance and is capable of heating a cooking tool using gas or electricity. As shown in FIG. 2C, the gas burner 10a and the induction burner 10b may be both provided in the cooking appliance.

The cooking appliance 100 may have a communication module inside and may communicate with the terminal 300 and the server 500 through the network 400, for example, the Internet. Otherwise, or in addition, the cooking appliance 100 may communicate in a wired or wireless manner with the AP device 200 to make a connection to the network 400. The cooking appliance 100 may include at least one of a WiFi communication module, a Zigbee communication module, a Bluetooth™ communication module, or an NFC communication module.

The terminal 300 may be a device equipped with a communication function. The terminal 300 may make a connection to the server 500 and/or the cooking appliance 100, may control or operate the cooking appliance 100, and may monitor operation of the cooking appliance 100.

An application or a dedicated application (hereinafter referred to as a "dedicated APP") for controlling and operating the cooking appliance 100 may be installed on the terminal 300. The terminal 300 may execute the dedicated APP, and thus, may input a control command to the cooking appliance 100 and may output data on the cooking appliance 100.

The terminal 300 may execute the dedicated APP, and thus, may make a connection to the server 500 in a wired or wireless manner through the AP device 200 and the network 400 and may remotely control and manage the cooking appliance 100 through communication with the server 500. In addition, from a remote location, the terminal 300 may execute the dedicated APP, and thus, may make a connection to the cooking appliance 100 through the AP device 200 and the network 400.

The terminal 300 may make a direct connection to the cooking appliance 100. The terminal 300 may receive data from the cooking appliance 100 and may transmit a control command to the cooking appliance 100.

According to embodiments, a smartphone, a tablet personal computer (PC), a personal digital assistant (PDA), a computer, or a laptop computer, for example, may be used as the terminal 300. In addition, a wearable device, such as a smartwatch, may be used as the terminal 300.

The terminal 300 may receive necessary data or information from the server 500 and/or the cooking appliance 100 and may output the received necessary data or information visually or audibly.

According to embodiments, the terminal 300 may receive and display a web page or an application screen that includes information associated with the cooking appliance 100, the information being provided from the server 500. The terminal 300 may transmit to the server 500 a control command that is input through a user operation.

The server 500 may communicate with the cooking appliance 100 using the network 400. Thus, the server 500 may collect and store information on the cooking appliance 100 and may reply with information requested by the cooking appliance 100.

The server 500 may also communicate with the terminal 300 using the network 400, and thus, may reply with data on the cooking appliance 100 requested from the terminal 300. Further, the server 500 may receive a control command from the terminal 300 and may control operation of the cooking appliance 100.

The server 500 may allocate identification to the terminal 300 with which the cooking appliance 100 is registered and may control connection of the terminal 300 to the cooking appliance 100. The server 500 may perform authentication on the terminal 300 making a connection to the server 500 and the cooking appliance 100.

The server 500 may be a single apparatus or may be a distributed processing system in which a plurality of server apparatuses is connected to each other, and thus, processes requested data in a distributed manner. In addition, the server 500 may be a server system based on a cloud service.

The server 500 may be a web server. Accordingly, a web page screen and data associated with the cooking appliance 100 may be provided to the terminal 300.

The server 500 may be equipped with a voice recognition algorithm. Accordingly, when receiving audio data, the server 500 may convert received audio data into text-format data and may output the resulting text-format data.

The server 500 may store firmware information and operating information of the cooking appliance 100 and may store product information of the cooking appliance 100. For example, the server 500 may be a server managed by a company manufacturing the cooking appliance 100 or by a company manufacturing a home appliance or may be a server managed by a manager of a store for applications opened to the public or by a service provider providing a service associated with the cooking appliance 100.

Figure 3:
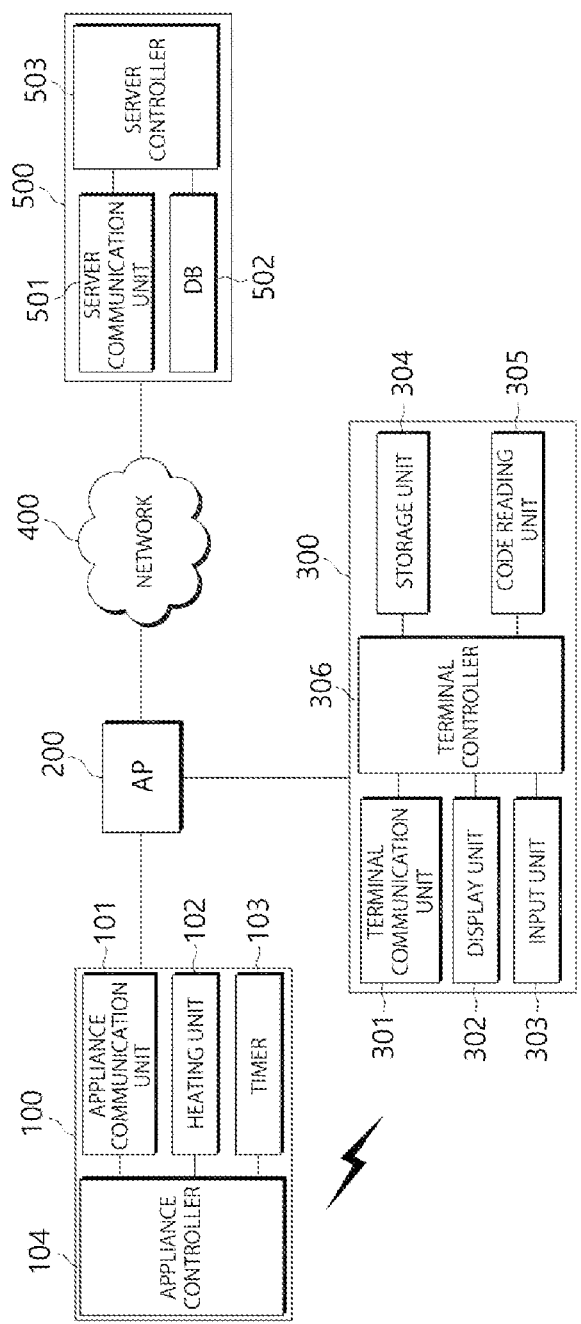
FIG. 3 is a block diagram of the system for controlling a cooking appliance according to an embodiment.

FIG. 3 is a block diagram of the system for controlling a cooking appliance according to an embodiment. With reference to FIG. 3, cooking appliance 100 may include an appliance communication unit 101, a heating unit 102, a timer 103, and an appliance controller 104.

The appliance communication unit 101 may communicate with each of the terminal 300 and the server 500. The appliance communication unit 101 may communicate with the terminal 300 using a communication module and may also communicate with each of the terminal 300 and the server 500 using the network 400.

The heating unit 102 may control operation of the burner 10 according to a control signal of the appliance controller 104. The heating unit 102 may control the operation of each of the plurality of burners 10 independently of each other. The heating unit 102 may not only turn on/off each burner 10, but may also adjust a thermal strength or power generated by each of the burners 10.

In a case in which the burner 10 is a gas burner, the heating unit 102 may turn on/off the burner 10 by supplying gas or shutting off the supply of gas and may adjust a thermal power by controlling an amount of gas supply. In a case in which the burner 10 is an induction burner, the heating unit 102 may turn on/off the burner 10 by powering on/off a working coil and may adjust a thermal power by controlling an amount of electric power.

Under the control of the appliance controller 104, the timer 103 may count the elapsed time. The elapsed time may be transmitted to the appliance controller 104.

The appliance controller 104 may control overall operation of the cooking appliance 100. The appliance controller 104 may detect and store usage information on each burner 10 by controlling the heating unit 102.

The usage information may include information on a position, a turning-on/off time, a usage time, and a thermal power, for example, of each burner 10. The information on the usage time may include information on whether or not the burner 10 is currently on and a period (date)-based usage time, and a total accumulative usage time, for example, of the burner 10.

The appliance controller 104 may perform control in such a manner that the usage information on each burner 10 is transmitted to the server 500 through the appliance communication unit 101. Transmission of the usage information may be performed each time the burner 10 is used or with a pre-set or predetermined periodicity.

The appliance controller 104 may control operation of the heating unit 102 according to a control command received from the terminal 300 and/or the server 500 through the appliance communication unit 101. The control of the operation of the heating unit 102 may be performed individually on each burner 10.

The control command to the cooking appliance 100 may be set in such a manner that one step is automatically performed or may be set in such a manner that various steps are automatically performed in a successive manner. For example, when receiving a control command to turn on a first burner, the appliance controller 104 may control the heating unit 102 so that the first burner is turned on in a manner that generates a preset or predetermined thermal power. For another example, when receiving a control command that performs steps of automatically turning on the first burner at 10:00 am in a manner that generates a second level thermal power, providing heating for three minutes, and then automatically turning off the first burner, the appliance controller 104 may control the heating unit 102 using the timer 103 in such a manner that these steps are automatically performed.

The cooking appliance 100 may receive a recipe from the terminal 300 or the server 500 through the appliance communication unit 101. The recipe may be a set of instructions for cooking food and may include information associated with the use of the burner 10, for example, information on a position, thermal power, and usage time of the burner 10.

When receiving the recipe, the appliance controller 104 may control the heating unit 102 according to the received recipe in such a manner that at least one step is performed. Accordingly, the appliance controller 104 may extract information for operating the cooking appliance 100 from the recipe and may control the heating unit 102 according to the extracted information.

For example, the appliance controller 104 may extract information on the heating time (the usage time) of the burner 10 and the thermal power (for example, a high thermal power/high temperature, a middle thermal power/middle temperature, or a low terminal power/low temperature, for example) of the burner 10 from the recipe and may control the heating unit 102 according to such information.

The terminal 300 may include a terminal communication unit 301, a display unit (display) 302, an input unit (input) 303, a storage unit (storage) 304, a code reading unit 305, and a terminal controller 306. The terminal communication unit 301 may communicate with the cooking appliance 100 and the server 500 through the network 400. Additionally, the terminal communication unit 301 may directly communicate with the cooking appliance 100 through WiFi.

State information on the cooking appliance 100 and a process of controlling the cooking appliance 100 may be displayed on the display unit 302. The state information may include an on/off state, and the usage time of each burner 10, for example, each burner 10 in the cooking appliance 100.

The input unit 303 may receive input from a user through a user operation. Through the input unit 303, the user may input a control command for controlling the cooking appliance 100.

According to embodiments, for example, the input unit 303 and the display unit 302 may be integrated into a single component or may be realized as a single module. In a case in which the display unit 302 and a touch sensor that detects a touch motion are structured in such a manner as to be layered on top of each other, and thus, form a touch screen, the display unit 302 may also be used as the input unit 303. The touch sensor may have the shape of, for example, a touch film, a touch sheet, or a touch pad, for example.

The dedicated APP, which is a program, may be stored in the storage unit 304. The information on the terminal 300 and the cooking appliance 100 may also be stored in the storage unit 304.

The code reading unit 305 may read or decode a preset or predetermined code. For example, the code reading unit 305 may include a camera (not illustrated). The camera may capture an image of a code associated with the recipe. Thus, the code reading unit 305 may extract code information from the code.

The code associated with the recipe may be a code including the code information corresponding to the recipe and may be implemented as, for example, a bar code or a Quick Response (QR) code, for example. The code may be shown on a cookbook, for example, that provides a recipe.

The terminal controller 306 may control overall operation of the terminal 300. According to the user operation applied to the input unit 303, the terminal controller 306 may execute the dedicated APP stored in the storage unit 304.

The terminal controller 306 may make a request to the cooking appliance 100 and the server 500 for information on the cooking appliance 100 using the dedicated APP through the network 400, and may display the information received from the cooking appliance 100 and the server 500 on the display unit 302. The terminal controller 306 may control the code reading unit 305 through the dedicated APP in such a manner that the image of the code is captured using the camera. Then, the terminal controller 306 may control the code reading unit 305 in such a manner that the code information extracted from the code is transmitted to the server 500 and that recipe information corresponding to the code information is received. The received recipe may be displayed on the display unit 302.

The terminal controller 306 may transmit the recipe to the cooking appliance 100. The recipe may be transmitted to the cooking appliance 100 through the AP device 200 and/or the network 400 or may be directly transmitted to the cooking appliance 100.

The terminal controller 306 may transmit the control command to the cooking appliance 100 through the dedicated APP. For example, the terminal controller 306 may transmit to the server 500 and/or the cooking appliance 100 a command to turn on/off the burner 10, a command to adjust the thermal power of the burner 10, or a command to request the usage time of the burner 10, for example. The terminal controller 306 may transmit control commands that automatically perform steps of turning on the burner 10 of the cooking appliance 100, adjusting the thermal power of the burner 10, and turning off the burner 10.

According to the applied user operation, the terminal controller 306 may perform control in such a manner that a web page or an application screen including the information associated with the cooking appliance 100 is displayed. For example, the terminal controller 306 may perform control in such a manner that a web page or an application screen on which a recipe designating a cooking method that uses the cooking appliance 100 is displayed. For another example, the terminal controller 306 may perform control in such a manner that a web page or an application screen associated with a method of operating the cooking appliance 100, that is, with the use of the burner 10, is displayed.

The server 500 may include a server communication unit 501, a database (DB) 502, and a server controller 503. The server communication unit 501 may communicate with the cooking appliance 100 and the terminal 300 through the network 400. The server communication unit 501 may receive the usage information on the burner 10 that is transmitted from the cooking appliance 100 and may store the received usage information in the DB 502. The server communication unit 501 may receive the control command to the cooking appliance 100 requested from the terminal 300 and may transfer the received control command to the cooking appliance 100.

Various information on the server 500, the cooking appliance 100, and the terminal 300 may be stored in the DB 502. More specifically, information on an operating state of the cooking appliance 100, such as a turned-on/off state, and the thermal power, and the usage time, for example, of each burner 10 may be stored in the DB 502. The information may be updated whenever transmitted from the cooking appliance 100, and the latest information stored.

Information on mapping between the terminal 300 and the cooking appliance 100 may be stored in the DB 502. Identification information of the terminal 300 and identification information of the cooking appliance 100 may be stored in a mapped manner. Thus, the terminal 300 and the cooking appliance 100 to be controlled by the terminal 300 are mapped to each other.

Recipes that correspond to each of the plurality of code information, respectively, may be stored in the DB 502. An image of a code may be captured by the code reading unit 305, and the code reading unit 305 may extract code information from the captured image of the code. The information on the position, the turned-on/off state, the thermal power, and the usage time, for example, of the burner 10 may be included in the recipe.

The server controller 503 may control overall operation of the server 500. The server controller 503 may perform authentication according to a request for authentication of the terminal 300 and the cooking appliance 100. The server controller 503 may map the terminal 300 and the cooking appliance 100 to each other using the identification information of the terminal 300 and the identification number of the cooking appliance 100 and may store a result of the mapping in the DB 502.

The server controller 503 may store in the DB 502 the usage information on the burner 10 transmitted from the cooking appliance 100 through the network 400. In addition, the server controller 503 may store in the DB 502 statistical information on the usage time of the burner 10 obtained using the usage information on the burner 10. The statistical information may include period (date)-based usage time, and up-to-date accumulative usage time, for example, of each burner 10.

The server controller 503 may receive the control command to the cooking appliance 100 from the terminal 300 and may transfer the received control command to the cooking appliance 100. Alternatively, the server controller 503 may directly control the operation of the cooking appliance 100 according to the control command.

The server controller 503 may transmit a recipe to the terminal 300 at the request of the terminal 300 and may transmit the recipe to the cooking appliance 100 according to a control command of the terminal 300. The server controller 503 may transmit the information on the cooking appliance 100 to the terminal 300 at the request of the terminal 300. More specifically, the cooking appliance 100 may transmit the usage information on each burner 10. The usage information may include the statistical information on the usage time.

When receiving a request to transmit a recipe to the cooking appliance 100 from the terminal 300, the server controller 503 may transmit the recipe to the cooking appliance 100. At this time, the server controller 503 may extract from the recipe the information for operating the cooking appliance 100. It is desirable that the position, the usage time, and the thermal power, for example, of the burner 10 may be extracted from the recipe. Then, using the extracted information, the server controller 503 may recommend the burner 10 to be used for the recipe.

The recipe may include various information. For example, the recipe may include information on a cooking tool used for cooking, information on food materials and seasoning ingredients necessary for cooking, and usage information on a burner to be used when cooking, for example.

The usage information on the burner may include the position, the thermal power, and the usage time, for example, of the burner 10. The server controller 503 may extract the usage information on the burner from the recipe.

For example, in a case in which a recipe for pasta contains information designating that a number 1 burner is to be used for one minute at a middle thermal power to boil the pasta, the server controller 503 may extract information associated with the use of the burner, such as "number 1 burner", "middle thermal power", and "used for one minute" and may recommend to the terminal 300 that the number 1 burner should be used in the actual cooking appliance 100. For another example, the usage information on the burner may be extracted separately from the recipe and be designated. For example, in the case of the recipe for pasta, information associated with the use of the burner 10, such as "burner to be used: number 1 burner", "thermal power: middle", and "usage time: one hour", may be provided separately, and the server controller 503 may check this information.

Figure 4:
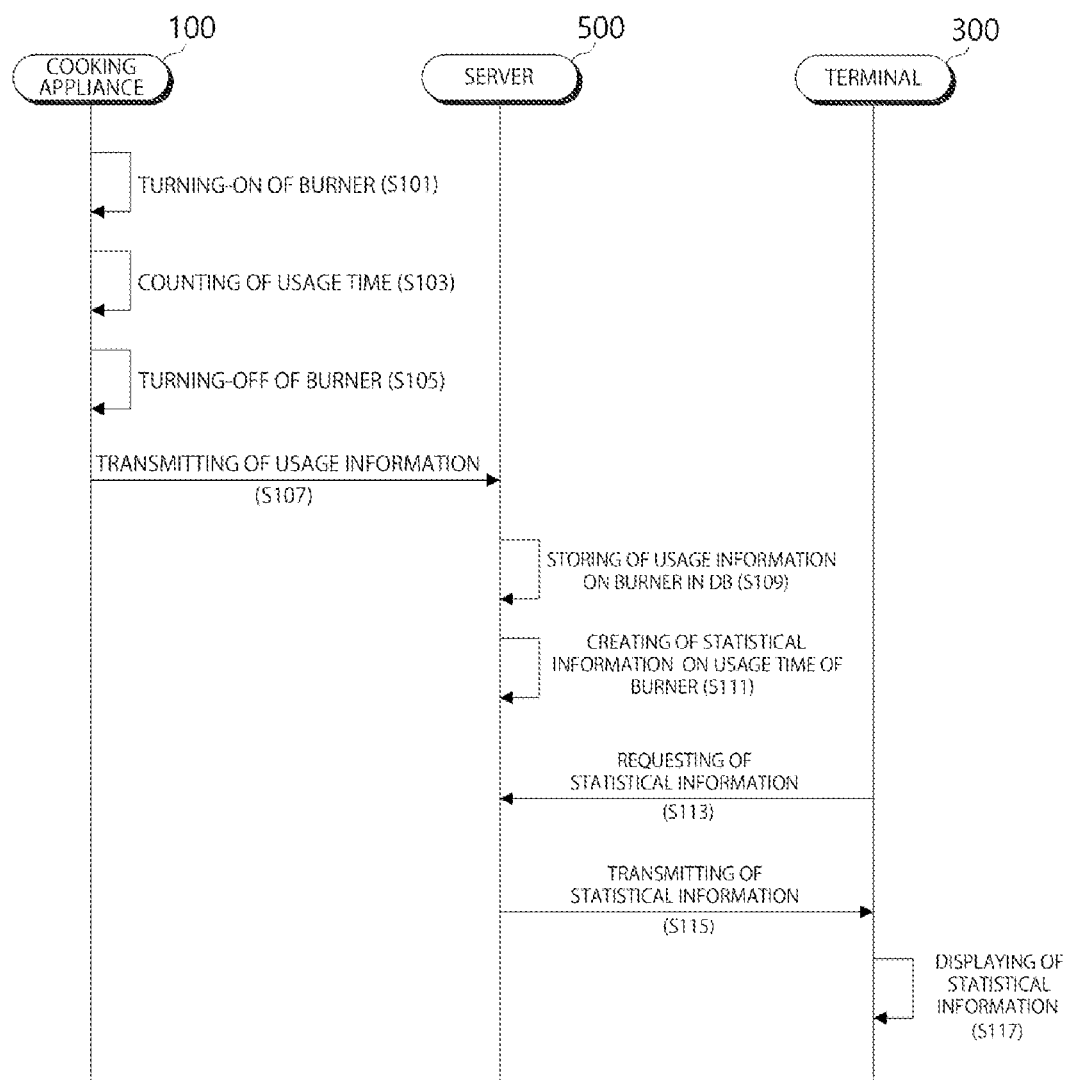
FIG. 4 is a flowchart of a method for controlling a cooking appliance according to an embodiment.

FIG. 4 is a flowchart of a method for controlling a cooking appliance according to an embodiment. Before performing the method for controlling a cooking appliance, the cooking appliance 100 may perform product registration with the server 500 using identification information thereof through a user operation. The terminal 300 may also perform user registration with the server 500 using the identification information through the user operation.

Accordingly, the server 500 may store the terminal 300 and the cooking appliance 100 set when performing the user registration, in such a manner as to be mapped to each other. When receiving the control command to the cooking appliance 100 from the terminal 300, the server 500 may control operation of the mapped cooking appliance 100.

The cooking appliance 100 may also perform product registration with the terminal 300. When the product registration with the terminal 300 is performed through the user operation, the terminal 300 and the cooking appliance 100 may be stored in such a manner as to be mapped to each other. Then, when the control command to the cooking appliance 100 is input into the terminal 300 through the user operation, the operation of the mapped cooking appliance 100 may be controlled.

The cooking appliance 100 may operate according to a control command of the mapped terminal 300. For example, the cooking appliance 100 may operate according to a control command for turning-on/off, a thermal power, and a usage time, for example, of the burner 10.

With reference to FIG. 4, in the method for controlling a cooking appliance according to embodiments, when the burner 10 is turned on (S101), the cooking appliance 100 may start to count the usage time of the burner 10 (S103). In addition, the cooking appliance 100 may detect an amount of gas or an amount of electricity supplied to the burner 10, and thus, may obtain information on the thermal power of the burner 10.

When the burner 10 is turned off (S105), the cooking appliance 100 may transmit to the server 500 the usage information including the usage time of the burner 10 counted while the burner 10 is turned on or off (S107). The usage time may include the information on the position, the turning-on/off time, the usage time, and the thermal power, for example, of each burner 10.

The server 500 may store the usage information on the burner 10 in the DB 502 (S109). The information on the usage time of the burner 10 may be analyzed, and thus, statistical information on the usage time of the burner 10 may be created (S111). The statistical information on the usage time may include the period (date)-based usage time, and the total accumulative usage time, for example, of the burner 10.

When receiving a request for the statistical information on the usage time of the burner 10 from the terminal 300 (S113), the server 500 may search the DB 502 for the stored statistical information on the usage time of the burner 10 and may transmit to the terminal 300 the statistical information found as a result of the search (S115). The terminal 300 may receive the statistical information on the usage time of the burner 10 from the server 500 and may display the received statistical information on the display unit 302 using a web page or a dedicated APP screen (S117). The total accumulative usage time of the burner 10 may be included in the statistical information on the usage time of the burner 10.

According to another embodiment, when the burner 10 is turned off (S105), the cooking appliance 100 may store the usage information on the burner 10 therein for later use instead of immediately transmitting the usage information on the burner 10 to the server 500. The cooking appliance 100 may transmit the stored usage information on the burner 10 to the server 500 at a preset or predetermined time or with a preset or predetermined periodicity.

In this case, whenever receiving the usage information on the burner 10 from the cooking appliance 100, the server 500 may update the usage information on the burner 10 and store the updated usage information in the DB 502. The server 500 may also update the statistical information on the usage time of the burner 10 and may store the updated statistical information on the usage time.

The server 500 may provide the statistical information on the usage time of the burner 10 in the form of a push-up message to the terminal 300 with a pre-set or predetermined periodicity. The user may set and/or change the pre-set or predetermined periodicity from the terminal 300. A guide information indicating the burner 10 used the least frequently up to now may be included in the statistical information on the usage time of the burner 10 in the form of the push-up message.

FIG. 5 is a flowchart of a method for controlling a cooking appliance according to another embodiment. FIGS. 6A to 6E are views illustrating the method for controlling a cooking appliance in FIG. 5.

Figure 6A:
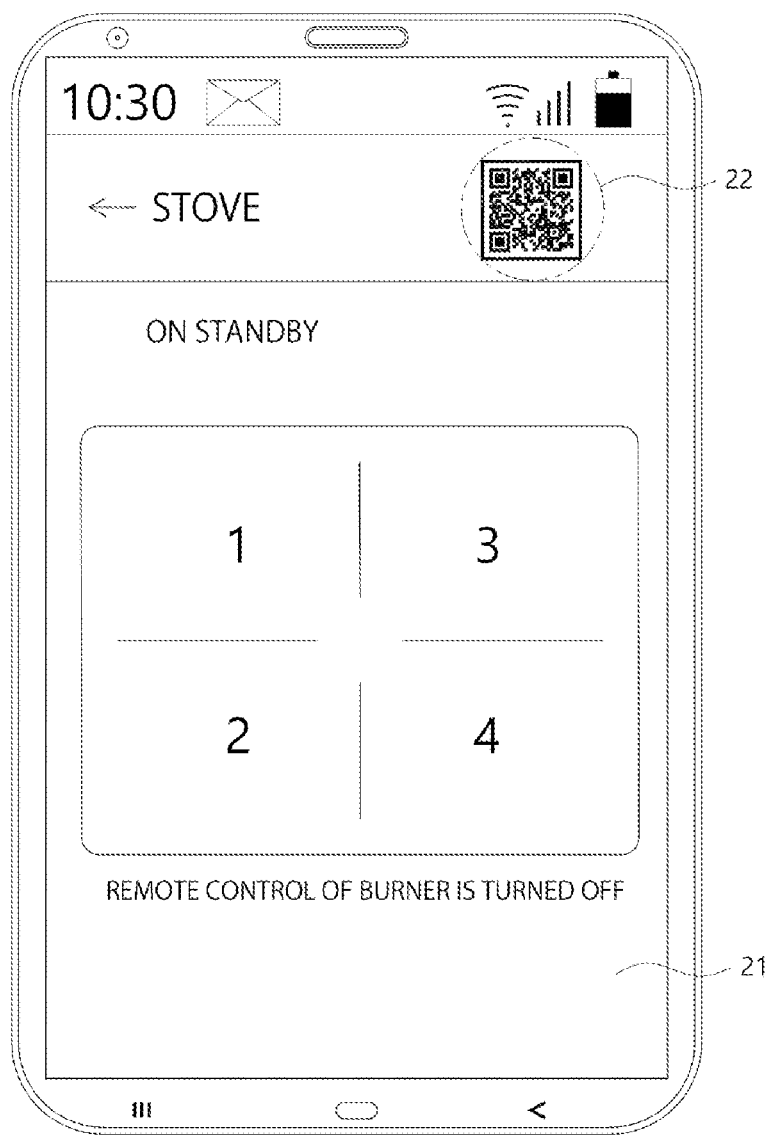
FIGS. 6A to 6D are views illustrating the method for controlling a cooking appliance in FIG. 5.

With reference to FIGS. 5 to 6E, in the method for controlling a cooking appliance according to another embodiment, a dedicated APP for controlling the cooking appliance 100 may be executed from the terminal 300 through user operation, for example (S201) (FIG. 6A).

When the dedicated APP is executed, a dedicated APP screen may be displayed. When an icon or a touch button for reading a code is touched through the user operation, for example, the code reading unit 305 may be activated.

Figure 6B:
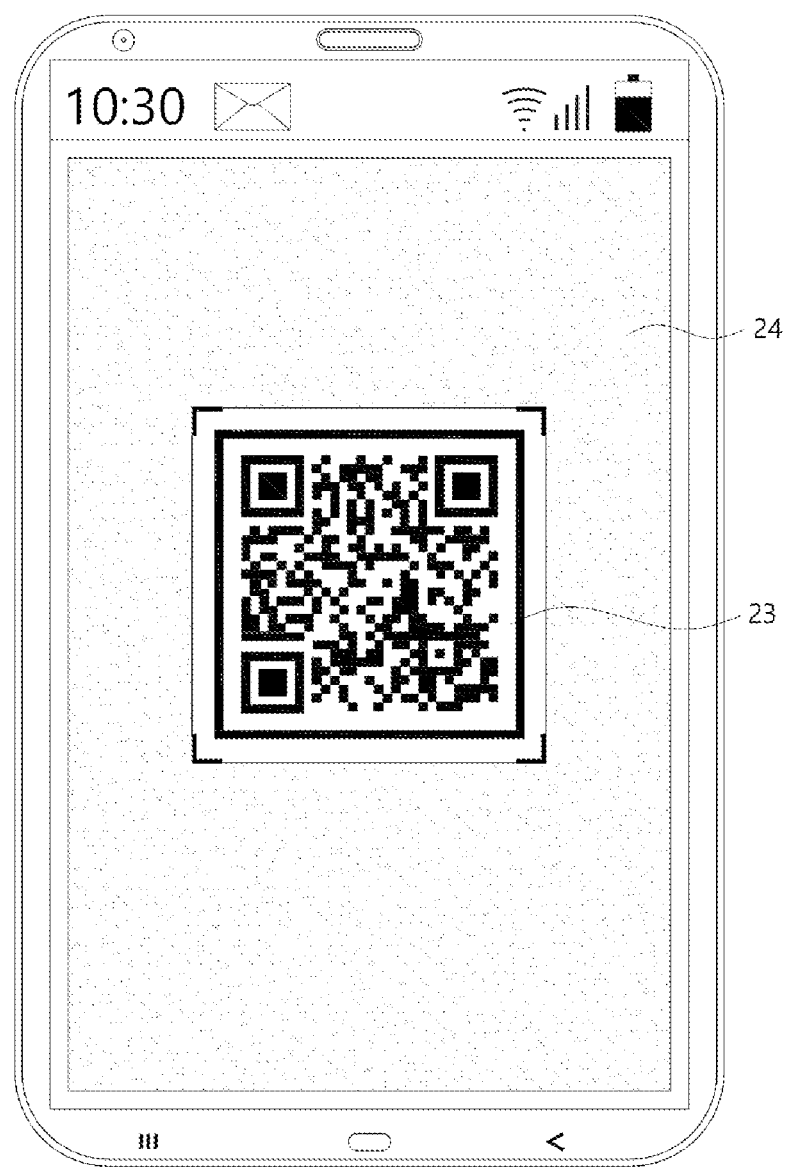

When the code reading unit 305 is activated, an image of a code is captured using a camera, and code information may be extracted from the captured image of the code (S203). According to this embodiment, the code information may be a code corresponding to a recipe (FIG. 6B).

FIG. 6A illustrates an example of the dedicated APP screen on the terminal 300. FIG. 6B illustrates an example in which the code reading unit 305 captures the image of the code.

In the example in FIG. 6A, an icon or a touch button 22 for reading a code may be displayed on dedicated APP screen 21. When the touch button 22 is touched through user operation, switching to a screen 24 for capturing an image of a code 23 may take place as in the example in FIG. 6B.

When the camera approaches the code 23, the code reading unit 305 may automatically capture the image of the code 23 and may automatically acquire code information from the captured image of the code 23. The terminal 300 may transmit the acquired code information to the server 500 and may request a recipe corresponding to the code information (S205).

When receiving the code information from the terminal 300, the server 500 may retrieve the recipe corresponding to the code information from the DB 502 (S207) and may transmit the retrieved recipe to the terminal 300 (S209). The terminal 300 may receive the recipe from the server 500 and may display the received recipe on the display unit 302 (S211). At this time, the terminal 300 may display the recipe on the display unit 302 using a web page or a dedicated APP screen (FIG. 6C).

Figure 6C:
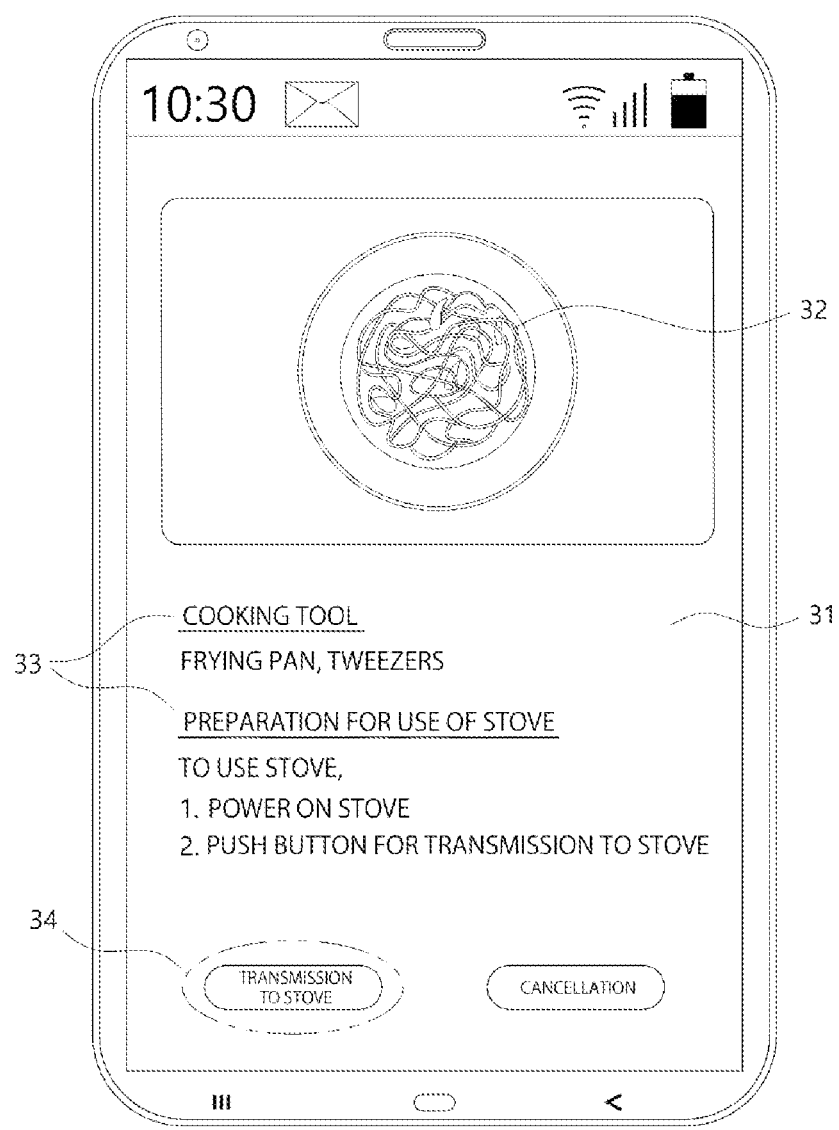

FIG. 6C is a view illustrating dedicated APP screen 31 on which the recipe is displayed. An image or a moving image 32 of food to be cooked may be displayed on the dedicated APP screen 31, and a description 33 of whether or not a cooking tool and/or a microwave oven is used, and how to cook the food, for example, may be displayed on the dedicated APP screen 31.

An icon or a touch button 34 for transmitting the recipe to the cooking appliance 100 may also be displayed on the web page or the dedicated APP screen 31 on which the recipe is displayed. When the touch button 34 is touched through the user operation (S213), the terminal 300 may transmit the recipe to the cooking appliance 100 (S215).

With the touch of the touch button 34, the terminal 300 may directly transmit the recipe to the cooking appliance 100. Alternatively, the terminal 300 may transmit the recipe to the server 500, and then the server 500 may transmit the receipted recipe to the cooking appliance 100.

In a case in which the recipe is transmitted to the cooking appliance 100 through the server 500, the server controller 503 of the server 500 may extract information associated with the use of the cooking appliance 100, more particularly, information associated with the use of the burner 10 from the recipe (S217). For example, the information on the position, the thermal power, and the usage time, for example, of the burner 10 to be used in a manner that corresponds to the recipe, among a plurality of burners 10, may be extracted.

The server 500 may transmit the position of the burner 10 to be used in a manner that corresponds to the recipe to the terminal 300, on the basis of the information extracted as described above (S219). The reason for this transmitting may be for the server 500 to recommend the burner 10 to be used for the recipe to the terminal 300.

Figure 6D:
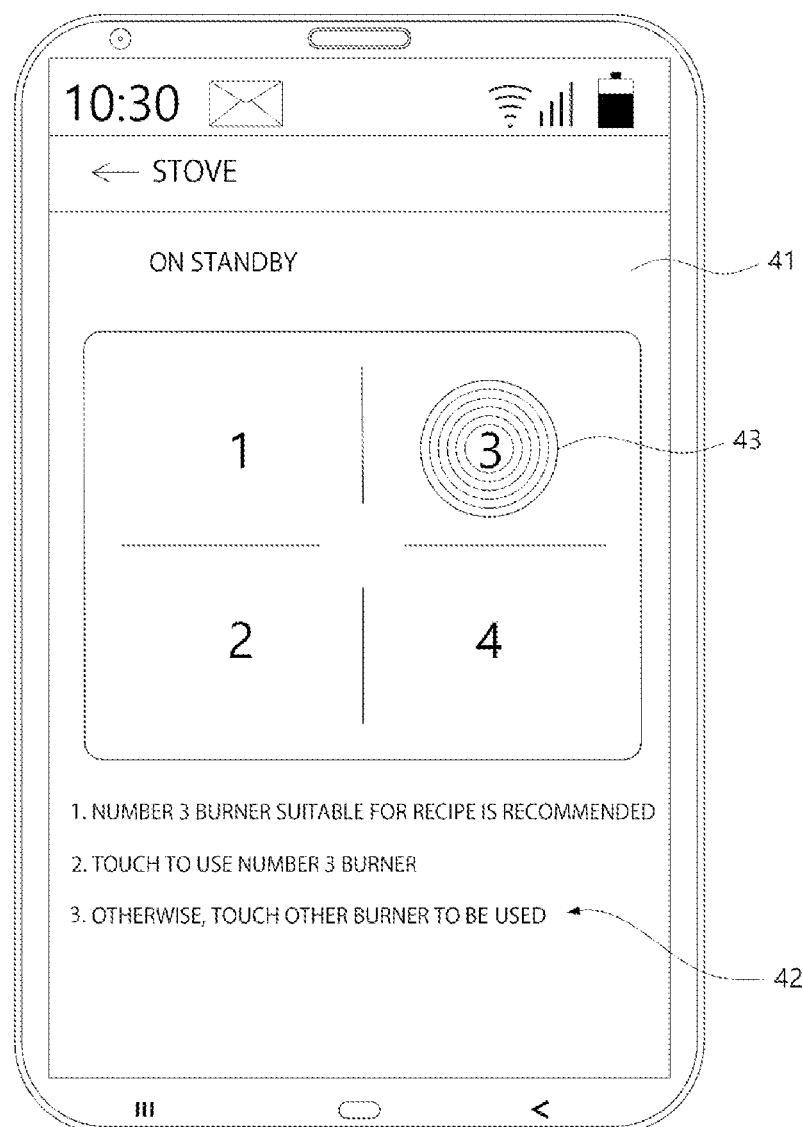

The terminal 300 may receive the position of the burner 10 to be used from the server 500 and may display the received position using a web page or a dedicated APP screen 41 (S221) (FIG. 6D). The reason for this displaying is for the server 500 to recommend the proper burner 10 for the recipe. Accordingly, the user may select the burner 10 most suitable for the recipe for the food to be cooked.

In the example in FIG. 6D, among four burners, a number 3 burner 43 positioned at an upper left portion of the cooking appliance 100 is recommended. As described above, the burner 43 recommended in a manner that corresponds to the recipe may be displayed on the web page or the dedicated APP screen 41 displayed on the display unit 302. The associated operation may operate when each of the touchable touch buttons on screens for all burners including a screen for the recommended burner 43 is touched.

When the touch button for the burner 10 recommended is touched through the user operation (S223), the terminal 300 may directly transmit to the cooking appliance 100 a control command for turning on the burner 10 positioned at a position indicated by the touched touch button or may transmit such a control command to the server 500 in such a manner that the server 500 transfers this control command to the cooking appliance 100 (S225). Accordingly, the cooking appliance 100 may operate in such a manner as to turn on an actual burner corresponding to the burner 10 according to the control command (S227).

Selectively or additionally, as in FIG. 6D, a message or text 42 alerting that the burner 10 is recommended for the recipe may be displayed on the web page or on the dedicated APP screen 41. The reason for this alerting is for the user to recognize easily and quickly that the burner 10 is recommended for the recipe.

In this manner, according to this embodiment, the user may check the recipe and may directly select the burner 10 to be used for the recipe. Thus, the user may cook food for the recipe. Further, the user may efficiently use the cooking appliance 100 and the burner 10.

In the example in FIG. 6D, although the burner 10 recommended in a manner that corresponds to the recipe is displayed on the web page or the dedicated APP screen 41 displayed on the display unit 302, the user may touch and select a burner 10 other than the recommended burner 10. Guide information indicating that a burner other than the recommended burner may be selected may be included in the text 42.

When a burner other than the recommended burner is touched, the terminal 300 may directly transmit to the cooking appliance 100 a control command to turn on the touched burner or may transmit such a control command to the server 500 in such a manner that the server 500 transfers this control command to the cooking appliance 100.

Figure 8:
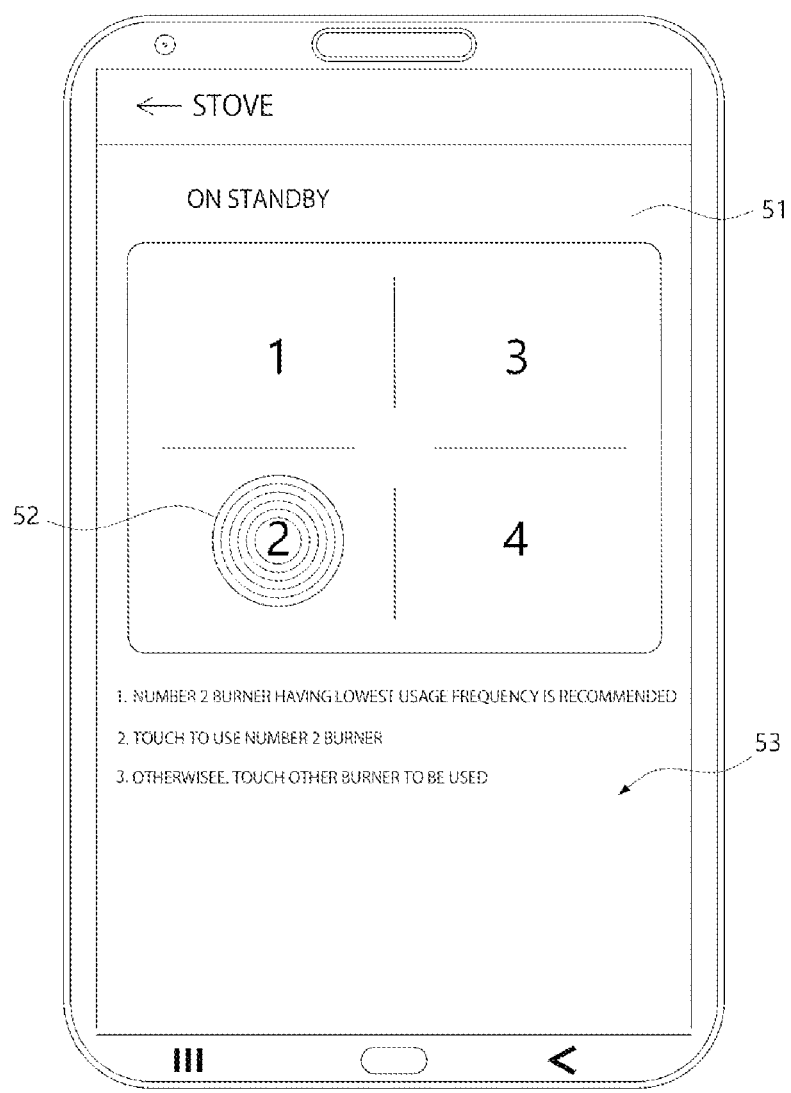
FIG. 8 is a view illustrating the method for controlling a cooking appliance, the method illustrated in FIG. 7.

FIG. 7 is a flowchart of a method for controlling a cooking appliance to a still another embodiment. FIG. 8 is a view illustrating the method for controlling a cooking appliance, the method being illustrated in FIG. 7.

With reference to FIGS. 7 and 8, in the method for controlling a cooking appliance according to still another embodiment, a dedicated APP for controlling the cooking appliance 100 may be executed from the terminal 300 through user operation, for example (S301) (FIG. 6A).

When the code reading unit 305 is activated, an image of the code is captured using a camera, and code information may be extracted from the captured image of the code (S303). According to this embodiment, the code information may be a code corresponding to a recipe (FIG. 6B).

When the dedicated APP is executed, a dedicated APP screen may be displayed. When an icon or a touch button for reading a code is touched through the user operation, for example, the code reading unit 305 may be activated.

When the camera approaches the code 23, the code reading unit 305 may automatically capture the image of the code 23 and may automatically acquire code information from the captured image of the code 23. The terminal 300 may transmit the acquired code information to the server 500 and may request a recipe corresponding to the code information (S305).

When receiving the code information from the terminal 300, the server 500 may retrieve the recipe corresponding to the code information from the DB 502 (S307) and may transmit the retrieved recipe to the terminal 300 (S309). The terminal 300 may receive the recipe from the server 500 and may display the received recipe on the display unit 302 (S311). At this time, the terminal 300 may display the recipe on the display unit 302 using a web page or a dedicated APP screen 31 (FIG. 6C).

An icon or a touch button 34 for transmitting the recipe to the cooking appliance 100 may also be displayed on the web page or the dedicated APP screen 31 on which the recipe is displayed. When the touch button 34 is touched through the user operation (S313), the terminal 300 may transmit the recipe to the cooking appliance 100 (S315).

With the touch of the touch button 34, the terminal 300 may directly transmit the recipe to the cooking appliance 100. Alternatively, the terminal 300 may transmit the recipe to the server 500, and then the server 500 may transmit the receipted recipe to the cooking appliance 100.

In a case in which the recipe is transmitted to the cooking appliance 100 through the server 500, the server controller 503 of the server 500 may extract information associated with the use of the cooking appliance 100, more particularly, information associated with the use of the burner 10 from the recipe (S317). For example, the information on the position, the thermal power, and the usage time, for example, of the burner 10 to be used for the recipe, among a plurality of burners 10, may be extracted. The information on the usage time may include the information on the section (period)-based usage time and/or the total accumulative usage time of each burner 10 and on the on/off state, for example, of each burner 10.

The server 500 may check the total accumulative usage time of each burner 10 on the basis of the information extracted as described above and may transmit a position of the burner 10 having a shortest total accumulative usage time to the terminal 300 (S319). When two or more burners 10 having the shortest total accumulative usage time are present, the burner 10 not recently used may be recommended and may be transmitted to the terminal 300.

The terminal 300 may receive the position of the recommended burner 10 from the server 500 and may display the received position thereof on the display unit 302 using a web page or a dedicated APP screen 51 (S321) (FIG. 8).

As in an example illustrated in FIG. 8, a burner 52 having the shortest usage time may be displayed on the display unit 302 of the terminal 300. Accordingly, when food is cooked for the recipe, it may be recommended that the burner 52 is used.

The recommended burner 52 may be displayed in a different color than other burners in such a manner as to distinguish it from the other burners. Accordingly, the user may check the recommended burner 52 easily and quickly.

When the recommended burner 52 is touched through the user operation (S323), the terminal 300 may directly transmit a control command for turning on the touched burner 52 to the cooking appliance 100 or may transmit such a control command to the server 500 in such a manner that the server 500 transfers this control command to the cooking appliance 100 (S325).

Accordingly, according to the control command, the cooking appliance 100 may operate in such a manner as to turn on an actual burner 10 corresponding to the burner 54 selected by the user (S327). Thus, additionally or selectively, a message or text 53 alerting that a burner having the shortest up-to-date accumulative total usage time (that is, a burner having a lowest usage frequency) is recommended may be displayed on the web page or the dedicated APP screen 51, as illustrated in FIG. 8, displayed on the display unit 302. The reason for this displaying is to encourage the user to use the recommend burner having the shortest up-to-date accumulative total usage time.

In this manner, according to this embodiment, the user may be encouraged to use a burner having a relatively short usage time, among the plurality of burners. Thus, the usage time or the usage frequency of each burner may be uniformly maintained, and overall usage efficiency of the cooking appliance 100 may be increased.

As in an example in FIG. 8, although the burner 52 having the shortest usage time is recommended and is displayed on the web page or the dedicated APP screen 51 displayed on the display unit 302, the user may touch, and thus, select a burner other than the recommended burner 52. When a burner other than the recommended burner 52 is touched, the terminal 300 may directly transmit a control command to turn on the touched burner 10 to the cooking appliance 100 or may transmit such a control command to the server 500 in such a manner that the server 500 transfers this control command to the cooking appliance 100.

Figure 9:
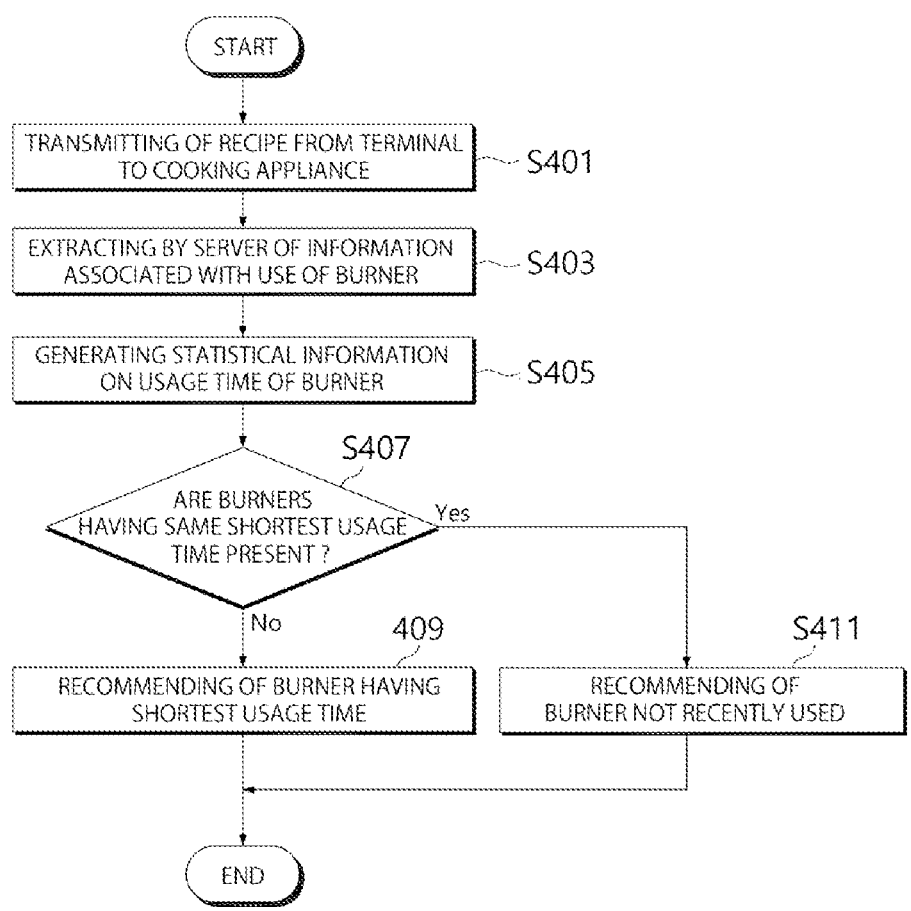
FIG. 9 is a flowchart illustrating an example in which a server according to an embodiment recommends a burner to be used in the cooking appliance.

FIG. 9 is a flowchart illustrating an example in which a server according to an embodiment recommends a burner to be used in the cooking appliance. With reference to FIG. 9, when the terminal 300 transmits a recipe to the cooking appliance 100 through the server 500 (S401), the server 500 may analyze the recipe and may extract information associated with the use of the burner 10 of the cooking appliance 100 (S403).

The information associated with the use of the burner 10 may include the information on whether or not each burner 10 is used and on a position, a thermal power, and a usage time, for example, of the burner 10 to be used. The server 500 may check the DB 502 for the statistical information on the usage time of each burner 10 on the basis of the extracted information (S405). The statistical information may include the information on the up-to-date total accumulative usage time of each burner 10.

With the statistical information, the server 500 may determine whether or not two or more burners having the shortest usage time are present (S407). When such burners are not present, the server 500 may transmit to the terminal 300 information on a burner 10 having the shortest up-to-date usage time and may recommend the use of such a burner 10 (S409). When such burners are present, the server 500 may transmit to the terminal 300 information on a burner 10 that is not recently used, among the burners having the shortest usage time and may recommend the use of such a burner 10 (S411).

Accordingly, the terminal 300 may display the burner 10 recommended by the server 500 on the display unit 302. Then, when the recommended burner 10 is touched through user operation, the terminal 300 may transmit a control command to use the recommended burner 10 to the cooking appliance 100. According to the control command, the cooking appliance 100 may turn on the actual burner 10.

Embodiments disclosed herein provide a system and a method for controlling a cooking appliance, the apparatus and the method capable of recommending a recipe-suitable burner that is set in a cooking appliance including a plurality of burners. Embodiments disclosed herein further provide a system and a method for controlling a cooking appliance, the apparatus and the method capable of recommending a burner having the shortest usage time (the lowest usage frequency) in a cooking appliance including a plurality of burners.

Embodiments disclosed herein furthermore provide a system and a method for controlling a cooking appliance, the apparatus and the method capable of providing statistical information on a usage time of a burner in a cooking appliance. Also, embodiments disclosed herein provide a system and a method for controlling a cooking appliance, the apparatus and the method capable of remotely turning on a burner recommended by a server from a terminal of a user.

In the system and method for controlling a cooking appliance according to embodiments disclosed herein, a cooking appliance may transmit usage information including a usage time of a burner to a server. The server may create statistical information on the usage time on the basis of the usage information and may transmit the statistical information to the terminal at the request of the terminal. Accordingly, the user may check the usage information on the burner of the cooking appliance through the terminal. The usage time of the burner may include at least one of a turning-on/off time, a period-based usage time, and a total accumulative usage time.

When a burner is turned on, the cooking appliance may count an elapsed time. When the burner is turned off, the cooking appliance may transmit the usage time of the burner to the server. Otherwise, the cooking appliance may store the usage time whenever the burner is turned on/off. The cooking appliance may transmit the stored usage time of the burner to the server with a preset or predetermined periodicity.

In the system and method for controlling a cooking appliance according to embodiments disclosed herein, the terminal may capture an image of a code associated with the recipe, extract code information, transmit the extracted code information to the server in order to request the recipe, receive the recipe from the server, and display the received recipe. The code may be implemented as, for example, a bar code, or a QR code, for example, associated with the recipe.

In the system and method for controlling a cooking appliance according to embodiments disclosed herein, when the terminal requests the server to transmit the recipe to the cooking appliance, the server may recommend a burner suitable or most suitable for the recipe among a plurality of burners included in the cooking appliance. The server may extract information on a position, a thermal power, and a usage time of a burner to be used in the cooking appliance from the recipe, and may recommend a burner corresponding to the extracted information to the terminal.

According to an applied user operation, the terminal may directly transmit a control command for turning on the recommended burner to the cooking appliance and/or may indirectly transmit the control command to the cooking appliance through the server. Further, the cooking appliance may turn on the recommended burner among the plurality of burners. Accordingly, the user may turn on a burner suitable or most suitable for the recipe using the terminal.

In the system and method for controlling a cooking appliance according to embodiments disclosed herein, the server may receive the usage time of each of the plurality of burners from the cooking appliance. Further, when receiving a request to transmit a recipe to the cooking appliance from the terminal, the server may recommend a burner having the shortest usage time on the basis of the usage time of the burner.

Accordingly, the burner having the shortest usage time (the lowest usage frequency) is recommended to the user. Thus, the usage frequency of all burners may be uniformly maintained, and the lifetime of only a specific burner frequently used by the user may be prevented from being shortened.

When the terminal transmits a control command for turning on the recommended burner to the server, the server transfers the control command to the cooking appliance, and the cooking appliance turns on the recommended burner according to the received control command. Accordingly, all the burners may be possibly used in a uniform manner in the cooking appliance.

In the system and method for controlling a cooking appliance according to embodiments disclosed herein, in a case in which the server transmits the burner having the shortest usage time to the terminal, the server checks the usage time of the burner that is stored in a DB and determines whether or two or more burners having the shortest usage time are present. When only one burner having the shortest usage time is present, the server recommends the burner having the shortest usage time to the terminal. When two or more burners having the shortest usage time are present, the server recommends to the terminal a burner not used the most recently.

The usage time of the burner may include at least one of the turning-on/off time, the period-based usage time, and the total accumulative usage time. The burner having the shortest usage time may be a burner having the shortest total accumulative usage time.

According to embodiments disclosed herein, a server for controlling the cooking appliance may be provided. The server may include a server communication unit configured to communicate with a cooking appliance including a plurality of burners and a terminal; and a DB configured so that a usage time of each of the plurality of burners of the cooking appliance is stored therein. The server may receive a usage time of the burner from the cooking appliance through the server communication unit, may store the received usage time in the DB, and when receiving a request to transmit a recipe to the cooking appliance from the terminal through the server communication unit, may recommend to the terminal a burner having the shortest usage time on the basis of the usage time of the burner that is stored in the DB. The server may create the statistical information on the usage time of the burner using the usage time of the burner and may transmit the statistical information on the usage time of the burner to the terminal at the request of the terminal.

The system and method for controlling a cooking appliance according to embodiments disclosed herein may have at least the following advantages.

The system and method for controlling a cooking appliance according to embodiments disclosed herein are capable of recommending to a terminal a burner suitable or most suitable for a recipe requested by the terminal. Thus, the burner suitable or most suitable for the recipe may be used, and utility of the cooking appliance and quality of cooking may be improved.

In the system and method for controlling a cooking appliance according to embodiments disclosed herein, a burner having the shortest usage time (the lowest usage frequency) is recommended among a plurality of burners when the user uses a burner of the cooking appliance. Thus, the burners may be uniformly used in the cooking appliance. Because a burner not frequently used is recommended, the lifetime of a specific burner may be prevented from being shortened.

In the system and method for controlling a cooking appliance according to embodiments disclosed herein, the cooking appliance transmits the usage time of a burner to the server with a preset or predetermined periodicity or immediately after the burner is used. Further, the cooking appliance transmits the usage time of the burner and/or the statistical information on the usage time of the burner to the terminal at the request of the terminal. Thus, the user may check usage frequency of each burner. Accordingly, the user may be encouraged to use a burner used less frequently.

In the system and method for controlling a cooking appliance according to embodiments, the burner recommended by the server may be remotely turned on from the terminal of the user. Thus, convenience in using the cooking appliance may be improved.

All terms, including technical or scientific terms, that are used above to describe the embodiments of the present disclosure, unless otherwise defined, have the same as those normally understood by a person of ordinary skill in the art which the present disclosure pertains. A commonly used term, such as a term defined in dictionaries, should be construed as having the same contextual meaning as that in the related art, and unless otherwise stated specifically in the present specification, should not be construed as having an excessively implied meaning or a purely literal meaning.

However, the technical idea is described above for illustration purposes only. It is apparent to a person of ordinary skill in the art to which the embodiments pertain that various alterations and modifications are possible without departing from the nature and gist. Therefore, embodiments disclosed herein are for describing the technical idea, rather than limiting it, and do not impose any limitation on the scope of the technical idea. Accordingly, the scope of protection should be defined by the following claims. All technical ideas that fall within the scope equivalent thereto should be interpreted to be included within the claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a cooking appliance, the method comprising:
    receiving, by a server, a usage time of each of a plurality of burners from a cooking appliance;
    receiving, by the server, a request to transfer a recipe from a terminal;
    recommending to the terminal, by the server, a burner of the plurality of burners having a shortest usage time;
    transmitting, by the terminal, a control command for turning on the recommended burner to the server;
    transmitting, by the server, the control command to the cooking appliance;
    turning on, by the cooking appliance, the recommended burner according to the control command; and
    wherein the recommending by the server of the burner comprises:
        determining whether or not two or more burners of the plurality of burners having the shortest usage time are present; and
        recommending to the terminal a burner of the plurality of burners having the shortest usage time if only one burner of the plurality of burners having the shortest usage time is present and recommending to the terminal a burner of the plurality of burners not recently used if two or more burners of the plurality of burners having the shortest usage time are present.

2. The method of claim 1, wherein the usage time of the burner includes at least one of a turning-on/off time, a period-based usage time, and a total accumulative usage time of the burner.

3. The method of claim 2, wherein the server recommends a burner of the plurality of burners having a shortest total accumulative usage time to the terminal.

4. The method of claim 1, wherein the receiving by the server of the request to transmit the recipe comprises:
    capturing, by the terminal, an image of a code associated with the recipe;
    extracting, by the terminal, code information from the captured image of the code;
    transmitting, by the terminal, the code information to the server;
    requesting, by the terminal, a recipe corresponding to the code information; and
    requesting, by the terminal, the server to transmit the recipe to the cooking appliance when the terminal receives the recipe from the server.

5. A method for controlling a cooking appliance, the method comprising:
    capturing, by a terminal, an image of a code associated with a recipe and requesting, by the terminal, a server to transmit the recipe;
    receiving, by the terminal, the recipe from the server;
    requesting, by the terminal, the server to transmit the recipe to the cooking appliance;
    recommending to the terminal, by the server, a burner of the cooking appliance to be used for the recipe;
    transmitting, by the terminal, a control command for turning on the recommended burner to the server;

transferring, by the server, the control command to the cooking appliance;

turning on, by the cooking appliance, the recommended burner according to the control command; and wherein the recommending by the server of the burner comprises:

determining whether or not two or more burners having a shortest usage time are present; and recommending to the terminal a burner having the shortest usage time if only one burner having the shortest usage time is present and recommending to the terminal a burner not recently used if two or more burners having the shortest usage time are present.

6. The method of claim 5, wherein the server extracts information on a position, a thermal power, and a usage time of a burner to be used in the cooking appliance from the recipe and recommends to the terminal a burner corresponding to the extracted information.

7. The method of claim 5, wherein the terminal captures the image of the code, extracts code information corresponding to the recipe from the captured image of the code, transmits the extracted code information to the server, and requests the recipe corresponding to the extracted code information.

8. A system for controlling a cooking appliance, the system comprising:

a cooking appliance including a plurality of burners and configured to transmit a usage time of each of the plurality of burners to the outside;

a terminal configured to transmit a recipe to the cooking appliance and control turning-on/off of the plurality of burners;

a server configured to receive the usage time of each burner of the plurality of burners from the cooking appliance, transmit the recipe to the cooking appliance at the request of the terminal, and recommend to the terminal a burner of the plurality of burners to be used for the recipe, wherein the terminal transmits to the cooking appliance a control command for turning on the burner recommended by the server, and the cooking appliance turns on the burner according to the control command;

wherein the server recommends to the terminal a burner of the plurality of burners having a shortest usage time; and wherein the server determines whether or not two or more burners of the plurality of burners having the shortest usage time are present, recommends to the terminal a burner of the plurality of burners having the shortest usage time if only one burner of the plurality of burners having the shortest usage time is present, and recommends to the terminal a burner of the plurality of burners not recently used if two or more burners of the plurality of burners having the shortest usage time are present.

9. The system of claim 8, wherein the server extracts information on a position, a thermal power, and a usage time of a burner of the plurality of burners to be used in the cooking appliance from the recipe and recommends to the terminal a burner of the plurality of burners corresponding to the extracted information.

10. The system of claim 8, wherein the terminal captures an image of a code associated with the recipe, extracts code information from the captured image of the code, and transmits the extracted code information to the server, and the server transmits the recipe corresponding to the code information to the terminal.

11. The system of claim 8, wherein the server creates statistical information on the usage time of the burner on the basis of the received usage time of the burner and transmits the statistical information on the usage time of the burner to the terminal at the request of the terminal.

12. The system of claim 8, wherein the cooking appliance counts an elapsed time when the burner is turned on and transmits the usage time of the burner to the server when the burner is turned off.

13. The system of claim 8, wherein the cooking appliance stores the usage time of the burner therein and transmits the stored usage time of the burner to the server with a predetermined periodicity.

14. A server, comprising:

a server communication unit configured to communicate with a cooking appliance including a plurality of burners and a terminal;

a database configured to store a usage time of each of the plurality of burners of the cooking appliance therein, wherein the server is configured to receive a usage time of each burner of the plurality of burners from the cooking appliance through the server communication unit, and to store the received usage time in the database, and to recommend to the terminal a burner of the plurality of burners having a shortest usage time on the basis of the usage time of the burners stored in the database when receiving a request to transmit a recipe to the cooking appliance from the terminal through the server communication unit; and wherein the server is configured to determine whether or not two or more burners of the plurality of burners having the shortest usage time are present, and to recommend to the terminal a burner of the plurality of burners having the shortest usage time if only one burner of the plurality of burners having the shortest usage time is present, and to recommend to the terminal a burner of the plurality of burners not recently used if two or more burners of the plurality of burners having the shortest usage time are present.

15. The server of claim 14, wherein the server is configured to create statistical information on the usage time of each burner of the plurality of burners, and to transmit the statistical information to the terminal at the request of the terminal.

* * * * *